United States Patent
Drake et al.

(10) Patent No.: US 6,392,775 B1
(45) Date of Patent: May 21, 2002

(54) OPTICAL REFLECTOR FOR MICRO-MACHINED MIRRORS

(75) Inventors: Joseph D Drake; John H. Jerman, both of Palo Alto, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/491,427

(22) Filed: Jan. 26, 2000

Related U.S. Application Data

(63) Continuation-in-part of application No. 09/135,326, filed on Aug. 17, 1998, now Pat. No. 6,134,207.
(60) Provisional application No. 60/123,514, filed on Mar. 8, 1999, and provisional application No. 60/071,038, filed on Jan. 13, 1998.

(51) Int. Cl.[7] ............................ G02B 26/08; G02B 1/10
(52) U.S. Cl. ...................... 359/224; 359/223; 359/582; 359/585; 257/431; 257/432
(58) Field of Search ................. 257/431, 432; 359/223, 224, 225, 295, 291, 582, 584, 585, 883

(56) References Cited

U.S. PATENT DOCUMENTS

| | | | |
|---|---|---|---|
| 4,309,075 A | | 1/1982 | Apfel et al. |
| 4,441,791 A | * | 4/1984 | Hornbeck .................... 359/295 |
| 4,963,012 A | * | 10/1990 | Tracy et al. ................. 359/883 |
| 5,216,551 A | * | 6/1993 | Fujii .......................... 359/584 |
| 5,424,876 A | * | 6/1995 | Fujii .......................... 359/584 |
| 5,459,610 A | | 10/1995 | Bloom et al. ................ 359/572 |
| 5,619,059 A | * | 4/1997 | Li et al. ...................... 257/431 |
| 5,636,051 A | * | 6/1997 | Lim ............................ 359/295 |
| 5,654,819 A | * | 8/1997 | Goosen et al. .............. 359/291 |
| 5,729,567 A | | 3/1998 | Nakagawa et al. ............ 372/99 |
| 5,739,945 A | | 4/1998 | Tayebati ..................... 359/291 |
| 5,818,623 A | | 10/1998 | Valette et al. ............... 359/224 |
| 5,825,528 A | | 11/1998 | Goossen ..................... 359/291 |
| 5,835,255 A | * | 11/1998 | Miles ......................... 359/291 |
| 5,835,273 A | | 11/1998 | Ida et al. ..................... 359/584 |
| 5,841,579 A | * | 11/1998 | Bloom et al. ................ 359/291 |
| 5,850,309 A | * | 12/1998 | Shirai et al. ................. 359/584 |
| 5,922,212 A | | 7/1999 | Kano et al. .................... 216/2 |
| 5,936,159 A | | 8/1999 | Kano et al. ............... 73/514.36 |
| 5,998,906 A | * | 12/1999 | Jerman et al. ............... 310/309 |
| 6,011,646 A | * | 1/2000 | Mirkarimi et al. ........... 359/584 |
| 6,052,217 A | * | 4/2000 | Hwang ....................... 359/291 |
| 6,075,639 A | * | 6/2000 | Kino et al. .................. 359/223 |
| 6,104,525 A | * | 8/2000 | Min ............................ 359/224 |

OTHER PUBLICATIONS

Patent Cooperation Treaty, International Search Report mailed Aug. 9, 2000.
K. Petersen, "Silicon Torsional Scanning Mirror," IBM J. Res. Develop, vol. 24, No. 5, Sep. 1980; pp. 631–637.
J.H. Jerman, D.J. Clift, S. R. Mallinson, "A Miniature Fabry–Perot Interferometer With A Corrugated Silicon diaphragm support", 1991, 0924–4247/91 Sensors and Actuators A, 29 (1991) 151–158.
H.A. Macleod, "Thin–Film Optical Filters", Second Edition, pp. 158–187, McGraw Hill Publishing Company. Dec. 1989 New York.
U. Breng, T. Gessner, C. Kaufmann, R. Kiehnscherf, J. Markert, "Electrostatic Micromechanic Actuators", pp. 256–261, 0960–1317/92/040256. 1992 IOP Publishing Ltd. J. Micromech. Microeng. 2(1992) United Kingdom.

* cited by examiner

*Primary Examiner*—Cassandra Spyrou
*Assistant Examiner*—John Juba, Jr.
(74) *Attorney, Agent, or Firm*—Flehr Hohbach Test Albritton & Herbert LLP

(57) ABSTRACT

The present invention includes a structure, apparatus, and method by which the reflectivity of a micro-machined reflector can be improved. The present invention increases the mirror's reflectivity at 650 nm, increases its reflectivity at 410 nm, and improves its long-term reliability. The reflectivity at other wavelengths may also be improved. Also, the present invention minimizes mirror plate distortion while providing a suitable fabrication approach.

16 Claims, 7 Drawing Sheets

OPTICAL REFLECTOR FOR MICRO-MACHINED MIRRORS

RELATED APPLICATIONS

The application (i) claims priority to U.S. provisional patent application Ser. No. 60/123,514 filed Mar. 8, 1999, the entire contents of which is incorporated herein by this reference, and (ii) is a continuation-in-part application of U.S. patent application Ser. No. 09/135,236 filed Aug. 17, 1998, now U.S. Pat. No. 6,134,207 which claims priority to U.S. provisional patent application Ser. No. 60/071,038 filed Jan. 13, 1998.

SCOPE OF THE INVENTION

The invention described below relates to the use of a micro-machined mirror for optical beam steering, switching, and scanning. More specifically, the improvements relate to enhancements to the mirror with respect to its reliability as well as its reflectivity.

BACKGROUND

In the prior art, micro-machined mirror reflectors have been described to comprise a single layer of gold affixed to a polysilicon mirror plate by an adhesion layer of chromium. Gold is a suitable choice because it is compatible with surface micro-machining processes which can be used to fabricate the mirror, is easy to pattern, and can be highly reflective (~95%). However, a layer of gold by itself cannot provide reflectivity significantly greater than 95%, is not adequately reflective at wavelengths shorter than about 600 nm, and if unprotected by appropriate coating layers is susceptible to corrosion upon long-term exposure to certain operating environments.

Gold (Au) does not adhere well to polysilicon without the inclusion of an adhesion layer, for example, chromium (Cr). Gold is a relatively inert material but does have the capacity to react in certain environments, especially those containing trace amounts of chlorine compounds. In reacting with chlorine, gold will corrode to render it unsuitable as a reflector. Although such a reaction may take years to have any significant impact, it may present a potential long-term reliability problem. In addition, pinholes in the gold layer may allow access to the underlying chromium adhesion layer, which can also corrode in the presence of chlorine compounds. Corrosion of the chromium may result in the loss of adhesion and delamination of the gold layer.

In 1980, K. E. Petersen described a silicon torsional scanning mirror ("Silicon Torsional Scanning Mirror", IBM J. Res. Develop., V24, Sep. 5, 1980, pp. 631–637) that included reflective surface made from a single layer of aluminum deposited on a rotatable silicon mirror plate. For this application, the versatility of micro-machining, aluminum was a suitable choice because it was easily incorporated into the process for creating the mirror.

More demanding applications require increased attention to the design of the reflective layer. In 1992, U. Breng, et. al., reviewed various metal films with respect to their reflectivity at an incident light wavelength of 780 nm ("Electrostatic Micromechanic Actuators," J. Micromech. Microeng., V2, 1992, pp. 256–261). Fabrication and operation of Breng's micro-machined mirror was quite similar to that of Petersen's mirror. But rather than settle on aluminum for the reflective layer, these researchers noted that higher reflectivity could be obtained by using a silver or gold. They chose to use gold as their reflector due to the long-term environmental instability of silver.

Multi-layer coatings have been studied as a solution for improving reflectivity from an optical surface. For example, through careful selection of the materials and thicknesses, the coatings can be targeted for very high reflectivity at the particular wavelength(s) of interest. Furthermore, with attention paid towards their chemical properties, the coatings can be made compatible with the chemistry of the in-use environment. However, in general, each layer of a multi-layer coating is likely to be deposited with significant thin film stress. When deposited on a very thin (2 um) free-standing plate, thin film stress can cause distortions in the plate. Minimization of the mirror plate distortion, both as fabricated and with respect to ambient temperature fluctuations, is necessary for good optical performance. In addition, the materials used in the coating should be compatible with the chemicals used in the fabrication process.

A widely used method to improve surface reflectivity from a single thin metallic layer employs a quarter wave stack (see, for example, H. A. MacLeod, *Thin Film Optical Filters,* McGraw-Hill, 1989). A quarter wave stack may be comprised of alternating layers of two non-absorbing dielectric materials one of which has a "high" index of refraction; the other has a "low" index. The thickness of each layer is chosen such that it's optical path length (index of refraction times physical film thickness) is one quarter of the wavelength ($\lambda/4$) of the light of interest. As the number of high-low (HL) pairs deposited on a given surface increases, the reflectivity for light incident on the surface at this wavelength increases until a theoretical maximum of somewhat less than 100% can be achieved. It should be noted that these examples are relatively simple optical coatings. A multi-layer coating can become quite complex in terms of the various films and physical film thicknesses and is determined by the function (i.e. beam-splitting, phase retardation, anti-reflection, etc.) that it is called upon to perform.

Multi-layer coatings such as those described above have been employed only rarely within the field of micro-machining. A known example was described by Jerman, et. al. ("A miniature Fabry-Perot interferometer with a corrugated silicon diaphragm support," Sensors and Actuators A, V29, 1991, pp. 151–158). A Fabry-Perot interferometer is an optical element consisting of two partially reflecting low-loss mirrors separated by a gap. In Jermans's device, multi-layer dielectric coatings were used as mirrors and were designed to be highly reflective at wavelengths between 1.30 and 1.55 um. Micro-machining techniques were employed to miniaturize the interferometer and to provide the gap as well as the ability to vary the gap width.

The optical coating layers described above exhibit some amount of residual thin film stress. In micro-machining, the coating may be deposited onto very thin structures that upon release from the substrate during manufacture can deform as a result of the residual stress in the coating. In addition, if the coatings are metallic, the coatings may form a bimetallic element, wherein additional deformation will be induced in the thin structures as a function of ambient temperature due to the differing coefficients of thermal expansion between the metal and the microstructure material. Attempts to minimize these deformations have been made by depositing the metalized reflector on both sides of the micro-machined structures so as to balance the stress with respect to the neutral axis of the structure. However, due to difficulties in controlling the metallic layer properties, the flatness of the plates that has been achieved has been less than optimal. In "Multilayer Film Structure and Vertical Cavity Surface Emitting Lasers" (U.S. Pat. No. 5,729,567, March 1998), S.

Nakagawa addressed the similar problem with respect to a multi-layer optical coating on GaAs substrates. Here a quarter wave stack comprised of silicon dioxide (L) and titanium dioxide (H) was used on a mirror. Deposition conditions were developed that provided film stresses for the two materials of equal magnitude but opposite polarity, such that the HL pair reduced stress.

Taking into consideration the discussion above, it is clear that improvements are needed in the prior art. Some of these improvements are discussed below.

SUMMARY OF THE INVENTION

Figure 1:
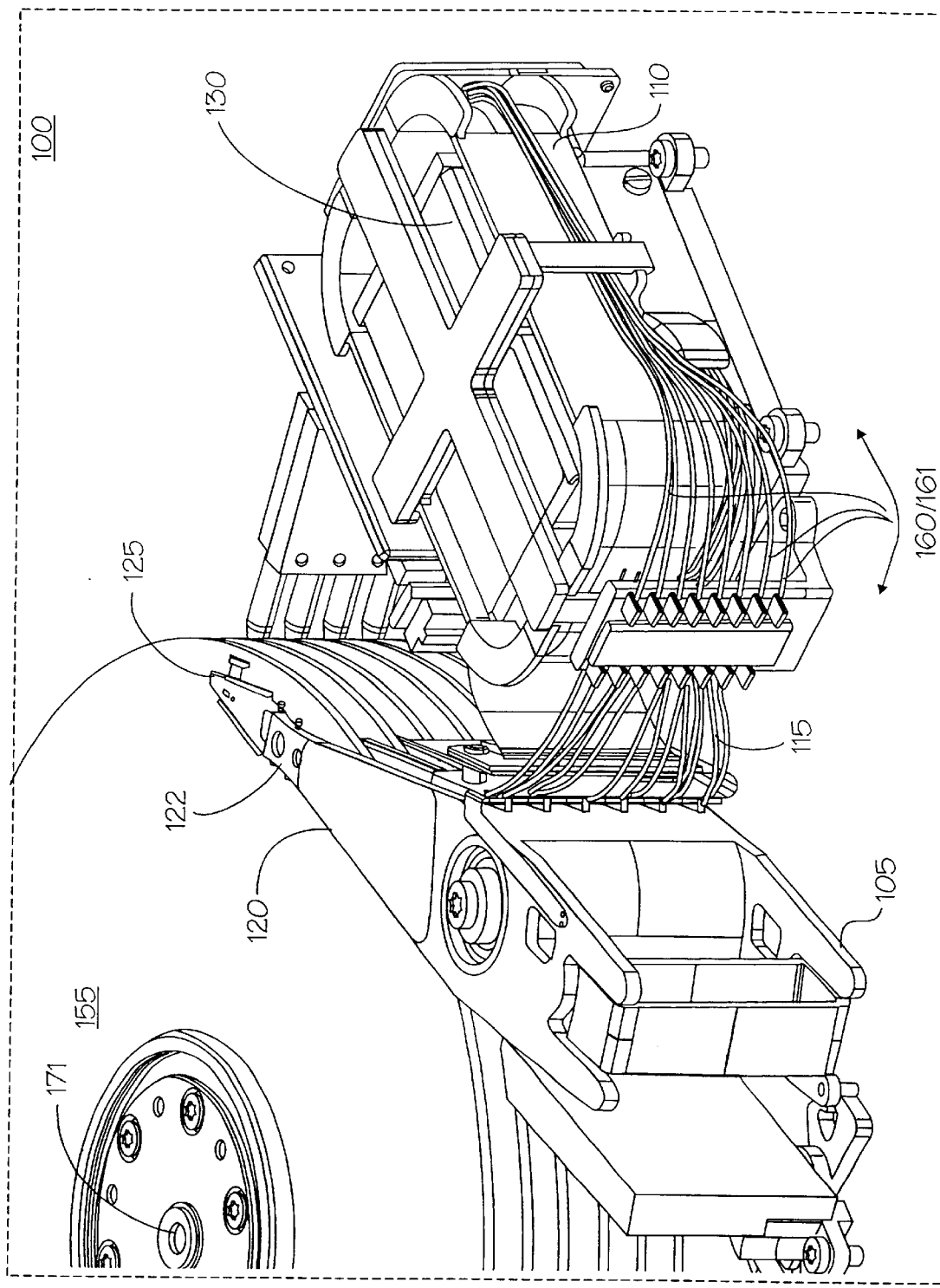
Referring now to FIG. 1, there is seen an optical disk drive incorporating the present invention.

The present invention includes a means and method by which the reflectivity of a micro-machined mirror can be improved. The micro-machined mirror may be steerable. The present invention increases the mirror's reflectivity at 650 nm, increases its reflectivity at 410 nm, and improves its long-term reliability. The reflectivity at other wavelengths may also be improved. Also, the present invention minimizes mirror plate distortion while providing a suitable fabrication approach.

In the present invention, the reflectivity of the micro-machined mirror is increased beyond that which is achievable with a single reflective layer alone. This is achieved through the use of an enhanced metallic reflector that is constructed by depositing a quarter wave stack directly on top of the reflective layer such that the reflectivity at a given wavelength is improved over that of the reflective layer acting alone. By appropriate selection of the metal and dielectric layers, as well as their deposited thicknesses, one can tune the layers to achieve a desired reflectivity. A dielectric coating on top of the metal layer serves to protect the metal from the corrosive effects of the environment. Also, the dielectric coating may be incorporated into an existing fabrication process, which may incorporate stiffening ribs as part of the mirror plate. The ribs serve to reduce deformations due to bimetallic effects. In addition, the multi-layer coating is deposited in a manner that minimizes the residual stress in the combined structure.

The present invention includes a mirror comprising a plate and a reflective layer, wherein the reflective layer disposed over the plate, and at least one optically transparent thin film disposed over the plate, wherein the at least one thin film is selected from the group of a quarter-wave thin film and a half-wave thin film. In the present invention, the reflective layer may comprise a first stress; the at least one optically transparent thin film may comprise a second stress; and the first stress is substantially equal to the second stress. The first stress may be a tensile stress, and the second stress may be a compressive stress. The reflective layer comprise a gold layer. The mirror may comprise an adhesion layer, wherein the adhesion layer is disposed over the plate, and wherein the reflective layer is disposed over the adhesion layer. The at least one optically transparent thin film may comprise a half-wave silicon nitride thin film. The reflective layer may comprise a side wall, and wherein the half-wave silicon nitride thin film is disposed over the side wall. The at least one optically transparent thin film may comprise a quarter-wave silicon nitride thin film and a quarter-wave silicon dioxide thin film. The reflective layer may comprise an aluminum layer. The at least one optically transparent thin film may comprise a quarter-wave silicon nitride thin film and a quarter-wave silicon dioxide thin film. The reflective layer may comprise a side wall, wherein the quarter-wave silicon nitride thin film is disposed over the side wall. The at least one optically transparent thin film may further comprise a half-wave silicon nitride thin film, wherein the half-wave silicon nitride thin film is disposed over the quarter-wave silicon nitride thin film, wherein the reflective layer comprises a side wall, and wherein the half-wave silicon nitride thin film is disposed over the side wall. In one embodiment, a reflectivity of the plate is at least 95%. In one embodiment, the plate comprises a micro-machined mirror plate. In one embodiment the mirror plate comprises a thickness of 2 um or less.

The present invention includes a mirror, comprising: a micro-machined plate and reflection means for reflecting light. The reflection means may comprise a reflective layer, the reflective layer disposed over the plate; and at least one optically transparent thin film disposed over the plate; the at least one thin film selected from the group of a quarter-wave thin film and a half-wave thin film. The plate may comprise a thickness of 2 um or less.

The present invention includes a data storage system comprising a micro-machined mirror plate; a reflective layer, the reflective layer disposed over the plate; and at least one optically transparent thin film disposed over the plate, the at least one thin film selected from the group of a quarter-wave thin film and a half-wave thin film. The reflective layer may comprise aluminum.

DETAILED DESCRIPTION

Referring now to FIG. 1 and preceding Figures as needed, there is seen an optical disk drive incorporating the present invention. The present invention may be used in a broad range of applications including those that require optical beam steering. One such application is in the optical disk drive 100 of FIG. 1, which is similar in appearance to a conventional Winchester drive in that a coarse actuator 105 is used to locate the position of an optical read/write head 125 from an inner diameter to an outer diameter of a rotating media 155. The drive 100 differs from that of the prior art in that a novel and new method of fine actuation is provided.

Figure 2:
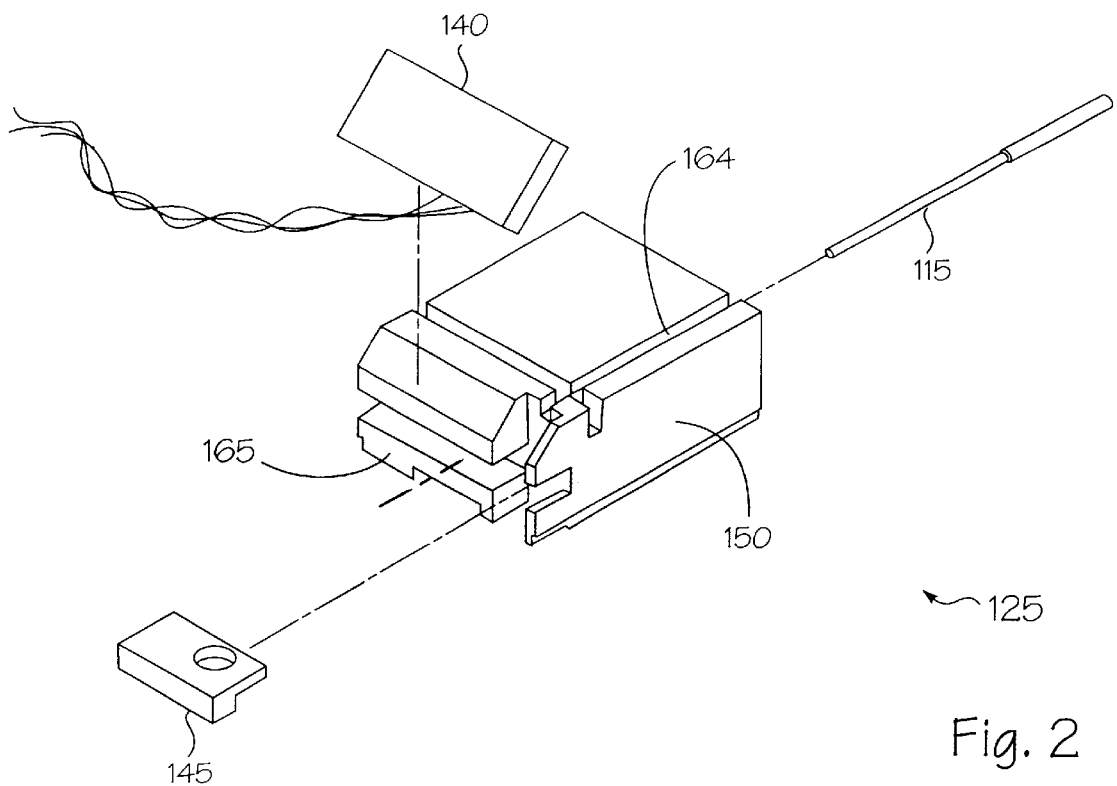
Referring now to FIG. 2, there is seen a head of the present invention.

Referring now to FIG. 2 and preceding Figures as needed, there is seen a head 125. As described in commonly assigned U.S. application Ser. No. 09/226,423, which is incorporated herein by reference, the head 125 comprises a flying optical head. The head 125 further comprises a fine actuator that in one embodiment comprises a micro-machined torsional mirror 140.

Figure 3:
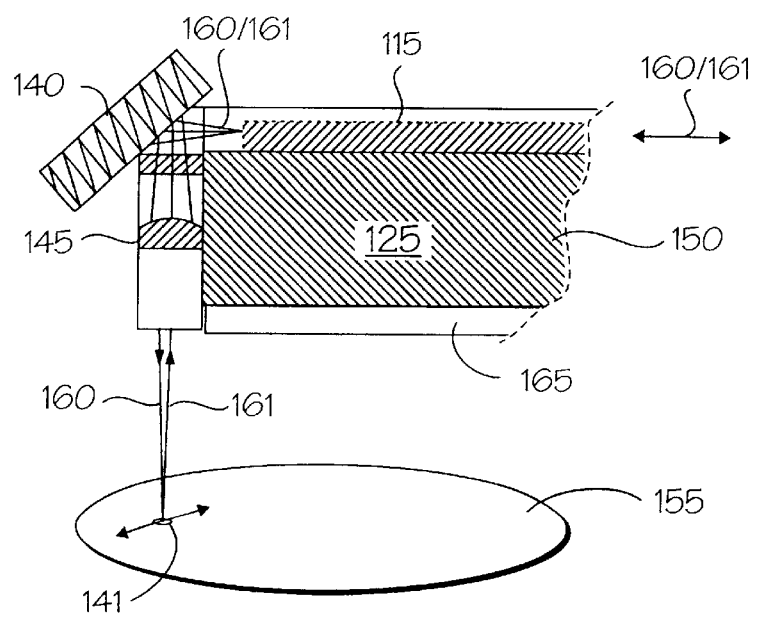
Referring now to FIG. 3, there is seen a fine actuator and flying optical head in a side view.

Referring now to FIG. 3 and preceding Figures as needed, there is seen a fine actuator and flying optical head in a side view. Electrostatic actuation of the micro-machined mirror 140 causes it to rotate to steer a light 160 from a laser (not shown) in a direction 141 over the media 155. Servo loop control is used to adjust the angle of the mirror 140 to allow for track following of very fine track pitches and for seeking across a small number of adjacent data tracks on the media 155.

Figure 4:
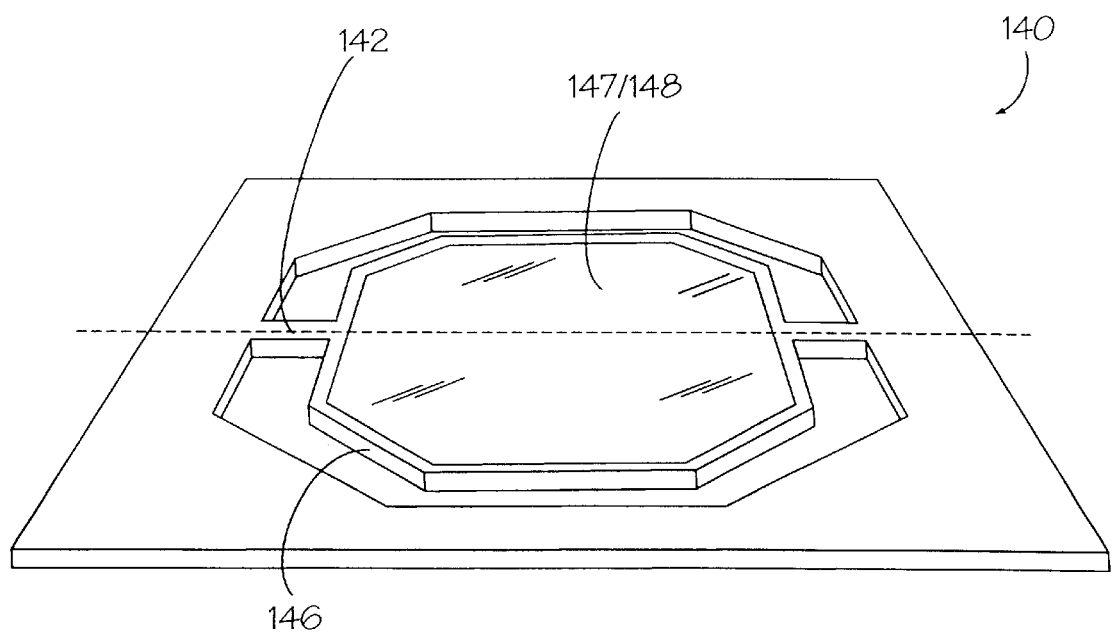
Referring now to FIG. 4, there is seen a micro-machined mirror in a close up perspective view.

Referring now to FIG. 4 and preceding Figures as needed, there is seen a micro-machined mirror in a close up perspective view wherein details with respect to the method of electrostatic actuation have been omitted. The micro-machined mirror 140 comprises a mirror plate 146 that is attached to a mirror substrate by torsional hinges 142. The mirror plate 146 is coated with a reflective layer 147 and thin films 148, which are described in further detail below. An embodiment of the structure of the mirror 140 and for its use in drive 100 is described in commonly assigned U.S. patent application Ser. No. 09/192,006, which is incorporated herein by reference.

The present invention identifies that it is desired to conserve energy consumption in the drive 100. This goal implicates the delivery of the power by the light 160 to the media 155 as well as the delivery of power in a reflection 161 of the light 160 from the media 155. In furtherance of energy conservation, for maximum return power in the reflected light 161, the mirror plate 146 should reflect the light 160 with as high efficiency as possible. For light 160 at a wavelength of 650 nm, a single layer of gold deposited over the mirror plate 146 at a thickness of 100 nm provides a reflectivity of approximately 95%.

The present invention further identifies that data storage densities can be improved if the wavelength of the light 160 is shortened, for example, by using a laser that emits light at a wavelength of 410 nm instead of 650 nm. However, with a single layer of gold reflectivity of the plate 146 decreases dramatically as wavelength is reduced below 600 nm; specifically, for example, at 410 nm, the maximum reflectivity of gold is only about 40%. Therefore in a preferred embodiment of drive 100, which utilizes a wavelength of 410 nm and a desired reflectivity of at least 95%, a single layer of gold deposited on the plate 146 by itself would be unsuitable.

Before discussing the present invention further, an understanding of the utility and design of multilayer thin film optical coatings is needed. Fortunately a full understanding is unnecessary due to the existence of commercially available software products that are well known for generating and analyzing optical coating designs. One such software package is TFCalc™ provided by Software Spectra. Nevertheless, some intuition into the design of these coatings can be obtained by keeping in mind the fundamental concepts described below that can be derived from Maxwell's equations.

Light propagation in a material is largely a function of the complex refractive index, $N=n-ik$, of the material. The real part of the refractive index, n, is also commonly referred to as the refractive index due to the fact that N in ideal dielectric materials is purely real. The imaginary part of the refractive index, k, is referred to as the extinction coefficient because it gives rise to an exponentially decaying intensity of the light as it propagates into the material. Ideal dielectrics are lossless and consequently k=0. For a thin film lossless dielectric, assuming a normal incidence of light, the product of the refractive index, n, and the physical thickness of the material gives the optical path length of that particular thin film layer. Typically, the thickness of the thin film is expressed as a function of the optical path length given the wavelength of the light that propagates in the film. Thus, quarter-wave and half-wave layers refer to thin films whose optical path length are one-quarter and one-half, respectively, of the light's wavelength.

As light propagates through a series of thin films, some portion of it is reflected at each thin film interface encountered. The total reflected light is therefore a summation of the components from the various reflections at these interfaces. Due to variations in the phase of the reflected light components, these components can interfere constructively or destructively such that the net reflected light intensity is reduced from what it would be if these thin films were not present. One example is that of a single half-wave thin film layer. In this case, the summation of the light components reflected from the two sides of the film is identical to the case wherein the half-wave layer is not present. In one embodiment of the present invention, this knowledge is used to create a lossless half-wave dielectric thin film that has minimal effect on the reflection or transmission of the light at the given wavelength.

Figure 5:
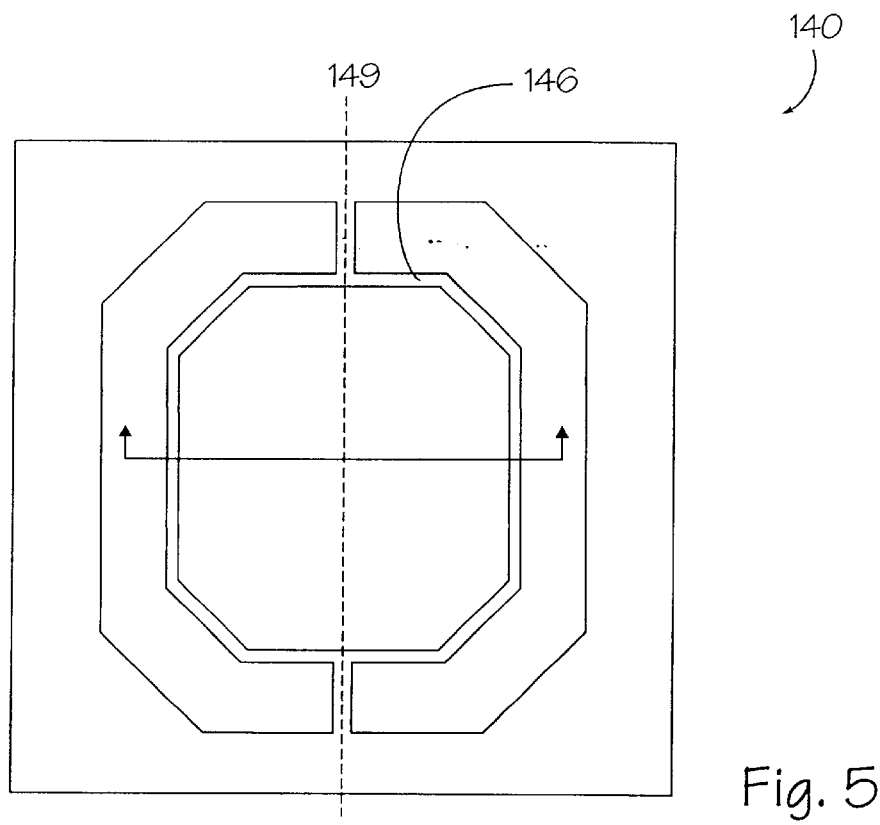
Referring now to FIG. 5, there is seen a top view of the mirror plate of the micro-machined mirror.

Referring now to FIG. 5 and preceding Figures as needed, there is seen a top view of the mirror plate 146 of the micro-machined mirror 140 wherein section AA' bisects the mirror plate 146 perpendicular to the rotational axis 149.

Figure 6:
Referring now to FIG. 6, there is seen a sectioned view of the mirror plate along section AA'.

Referring now to FIG. 6 and preceding Figures as needed, there is seen a sectioned view of the mirror plate 146 along section AA' of FIG. 5. In the embodiment of FIG. 6, reflective layer 147 is comprised of a 100 nm thick layer of gold affixed to the polysilicon mirror plate 146 by adhesion layer of chromium 5 nm thick (not shown). Overlaying the reflective layer 147 is a half-wave layer of silicon nitride that serves as a dielectric layer. The half-wave stack of silicon nitride comprises one embodiment of the thin films 148 of FIG. 4 and can be used to protect the chromium and gold layers from the use environment. In this embodiment it is understood that reflectivity of the plate 146 is limited by the reflective properties of the reflective layer 147, which in the case of light 160 at 650 nm provides a reflectivity of 95%.

Figure 7:
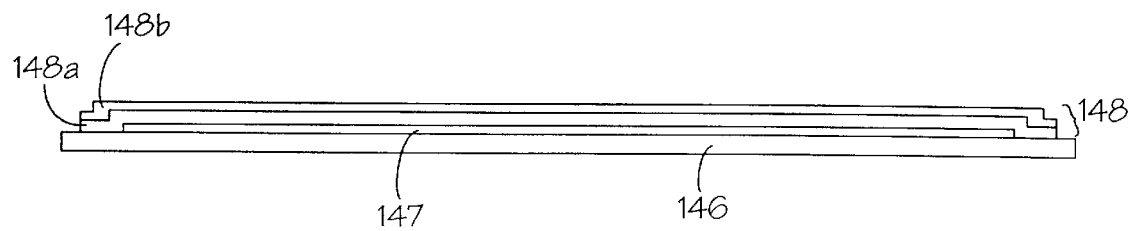
Referring now to FIG. 7, there is seen a sectioned view of the mirror plate along section AA' in an embodiment of the present invention that utilizes a HL quarter-wave stack.

Referring now to FIG. 7 and preceding Figures as needed, there is seen a sectioned view of the mirror plate 146 along section AA' in an embodiment of the present invention that utilizes a HL quarter-wave stack of the present invention.

The present invention identifies that a multi-layer quarter wave stack of dielectric thin films may also be deposited on top of the reflective layer 147 to comprise thin films 148. The present invention identifies that constructive interference occurring at the interfaces of the thin films 148 may be used to increase reflectance of the underlying reflective layer 146. In the embodiment of FIG. 7, the thin films 148 comprise at least one pair of quarter-wave layers deposited on top of the reflective layer 147. Each pair comprises a layer of a material with a "high" (H) index of refraction and a layer with a "low" (L) index. This arrangement is referred to as a HL pair. For a single HL pair (with the H film on the topside of the stack) both the reflectivity and the wavelength bandwidth are increased as the ratio of the two indices is made higher. The present invention further identifies that for a given choice of the H and L materials, as more HL, pairs are placed on top of the reflective layer 147, reflectivity is increased. In an exemplary embodiment, the reflective layer 147 is comprised of a 100 nm thick layer of gold affixed to the polysilicon mirror plate by an adhesion layer of chromium 5 nm thick. Overlaying the reflective layer 147 is a single HL pair of quarter-wave layers. More precisely a "L" quarter-wave layer of silicon dioxide 148a rests directly on top of the gold layer while a "H" quarter-wave layer of silicon nitride 148b rests as a topmost layer. It should be appreciated that in other embodiments additional HL pairs may be deposited upon the initial HL pair in order to further enhance the reflectivity of the combined stack. In practice, however, it is desirable to keep the number of HL pairs of the thin films 148 to the minimum required to achieve a particular desired reflectivity from the mirror plate 146. It should be noted that a reflective layer 147, for example a gold layer, is typically soft and thereby easily damaged by physical contact. Thus, the presence of dielectric layers 148a and/or 148b provides an additional advantage of protecting the reflective layer 147 from mechanical damage.

Referring back to FIG. 3, the micro-machined mirror 140 is configured such that the light 160 impinges on the mirror plate 146 at a 45 degree angle of incidence rather than a normal incidence. This orientation complicates reflectivity calculations due to the fact that for non-normal incidence there are two orientations (polarizations) of the electric field vector that satisfy the boundary conditions of Maxwell's equations, and the total field solution must take into account both orientations. It is customary to refer to these two polarizations as TM (for transverse magnetic) or P-polarization and TE (transverse electric) or S-polarization. In P-polarized waves, the electric field vector is oriented in the plane of incidence; S-polarization has the electric field vector normal to the plane of incidence. Any given electromagnetic field of arbitrary polarization can be decomposed into two components of these orientations. The reflectivity of the stack of thin films 148 can be calculated at non-normal incidence and the reflectivity results presented below represent the average reflectivity of the two polarizations from the thin films.

As mentioned previously, light intensity in absorbing films (i.e. nonzero k) decreases as the light 160 propagates into the thin films 148. Thus some portion of the light 160 is lost in the thin films 148 such that the reflectivity enhancement properties are diminished. This is true of most real world dielectric films, but, typically, the extinction coefficient is sufficiently close to zero that the films' usefulness is maintained. Also, real materials tend not to be dispersion-free, that is, their n and k values are not constant as a function of wavelength. Accounting for dispersive lossy materials as well as non-normal angles of incidence makes optimization of the multi-layer coating more complicated than what is suggested by the above descriptions. For example, optimizing the reflectivity at a given reference wavelength may involve HL stacks with film thicknesses somewhat different than the expected quarter wave values. These effects can all be taken into account with software that uses an optimization algorithm for calculating the thicknesses needed to provide the best reflectivity for real world materials and applications.

The present invention further identifies that although the thin films 148 described above can be used to improve the reflectivity of the mirror plate 146, certain other issues may need to be addressed in order to use the thin films 148 effectively. First, the thin film materials to be used should be compatible with the fabrication process used in manufacturing the mirror 140. It the preferred embodiment, materials that are resistant to the chemicals and environments presented by the process are desired. In the alternative, a reliable approach towards process design should comprise steps such that the thin films do not come in contact with harmful chemicals. In addition, it is preferred that the materials used be commonly available and routinely processed in semiconductor processing labs. Secondly, and perhaps more problematic, is the need to control residual stresses in the thin films 148 applied to the mirror plate 146 such that they do not contribute to an excessive tendency for the mirror plate 146 to deform following a release etch step. To at least this end, the present invention utilizes the same alternating layers of silicon dioxide ($SiO_2$) 148a and silicon nitride ($Si_3N_4$) 148b described above to increase reflectivity. Both of these materials are commonly encountered in semiconductor manufacturing and can be deposited on the mirror plate 146 by a variety of means including sputtering, evaporation, and chemical vapor deposition. They also can be routinely patterned and etched. These materials can be largely protected from the process by depositing and patterning them very near the end of the fabrication process so that they experience little or no effects from chemical or environmental conditions (e.g. high temperatures). Despite this process approach, the thin films 148 should also withstand chemical attack from concentrated hydrofluoric acid (HF) if it is used to perform the release etch step of the mirror plate 146. Silicon dioxide will, however, readily etch in HF and so needs protection during this step. The present invention identifies that because stoichiometric silicon nitride is resistant to HF it can be used as the topmost layer of the stack of the thin films 148 to protect the silicon dioxide layer and any other layers below. Thus, the topmost layer of silicon nitride may deposited after all the underlying layers have been deposited and may be patterned in a separate step. It is identified that this procedure can be used to pattern the topmost layer to overlap the underlying layers and the underlying layer's sidewalls so as to protect the entire geometry of the underlying layers; this result is evident in FIGS. 6–8. In FIG. 6, it is understood that the topmost layer 148 comprises a half-wave layer of silicon nitride. By using a half wave layer as a protective topmost layer, the reflectivity of the layers below is left undisturbed as was discussed with reference to FIG. 6 above. Often, however, sputtered or evaporated silicon nitride does not exhibit the resistance to HF that one expects from stoichiometric silicon nitride. This invention avoids this limitation by depositing the dielectric layers after the HF release etch.

It is identified that the mirror plate 146 may exhibit some curvature following a process release etch step. The present invention identifies that the curvature needs minimization to achieve non distorted reflection from the mirror plate 146. In the preferred embodiment, the desired radius of curvature of the released mirror plate 146 is desired to be greater than 10 cm. If the mirror plate 146 is made of polysilicon, stresses may be relieved in the plate through the use of long duration high temperature anneal cycles. Thus, it is identified that in the absence of any deposited thin films 148, the curvature of the mirror plate 146 can be controllably minimized. The present invention further identifies that the each the reflective layer 147 and/or thin films 148, when deposited, exhibits its own residual film stress which may add curvature in the plate 146. In fact, the total curvature that may be induced on the plate 146 is approximately a linear combination of terms where each thin film layer contributes a term proportional to the product of its physical thickness and residual film stress.

Figure 8:
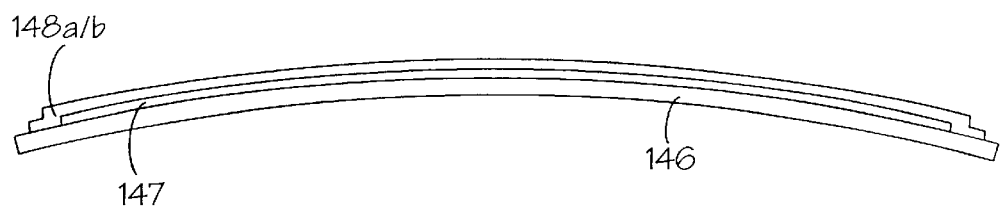
Referring now to FIGS. 8 and 9, there is seen thin films on top of a reflector layer, wherein the net effect of these thin films is to cause curvature to appear in a mirror plate.
Figure 9:
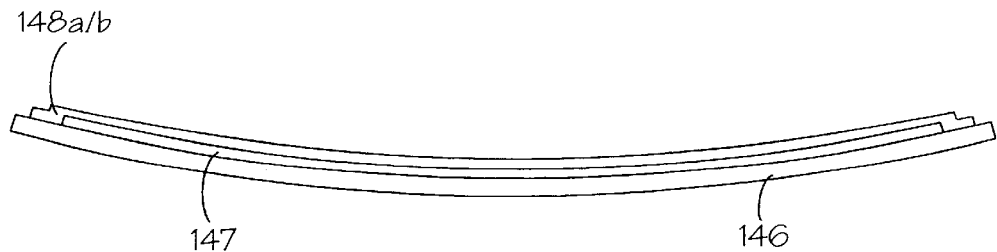

Referring now to FIGS. 8 and 9 and preceding Figures as needed, there is seen thin films 148 on top of the reflector layer 147, wherein the net effect of these thin films is to cause curvature to appear in the mirror plate 146. As is evidenced by the direction of the curvature, the net residual stress of thin films 148 may be negative (compressive) or positive (tensile). The present invention identifies that the residual stresses of the reflector layer 147, when deposited on the polysilicon plate 146, tend to be positive (tensile) whereas that of the dielectric thin film layers 148 tend to be negative (compressive) and that if the residual stresses and thicknesses are controlled appropriately, the additive effect of these layers can be minimized to result in minimal plate 146 curvature. Three embodiments of the approaches discussed above are disclosed below together with fabrication alternatives that may be used to realize the desired structures.

A. Protected Gold Reflector (650 nm Laser Light)

Figure 10:
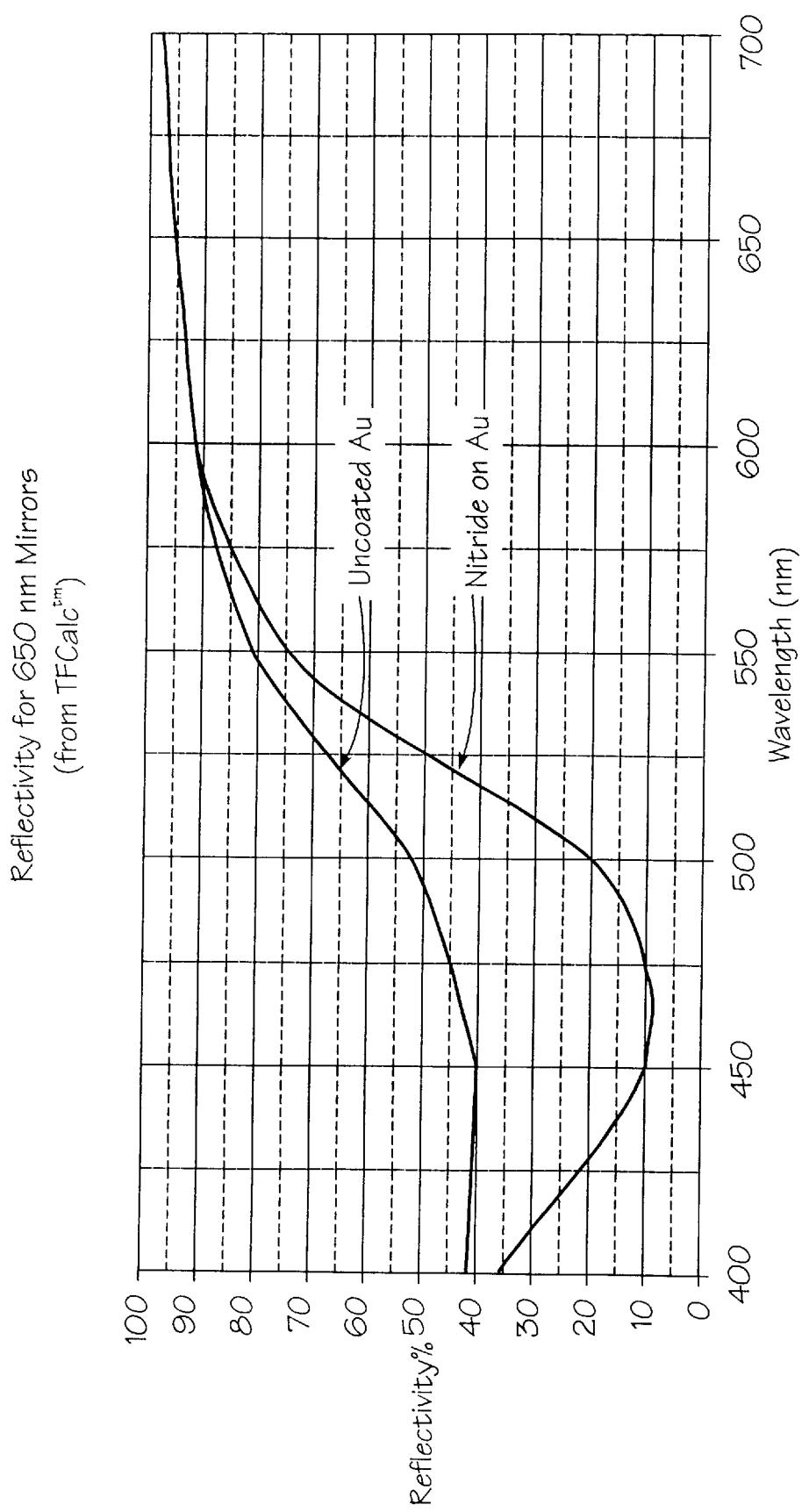
Referring to FIG. 10, there is seen a plot of reflectivity at 650 nm.

As suggested above, a bare layer of gold (Au) deposited on a layer of chromium (Cr) comprised as a reflective layer 147 presents limitations with respect to long-term reliability and use in certain environments. Chemical degradation of a Cr—Au reflective layer is possible even when trace amounts of chlorine are present. As discussed with reference to FIG. 6 above, by depositing the half wave thin film layer 148 of silicon nitride on top of a reflective gold layer 147, one can retain the excellent reflective properties of gold at 650 nm while protecting the Cr—Au layers from corrosion. Silicon nitride is essentially lossless and its refractive index is 2.0. In an exemplary embodiment, a half wave layer of silicon nitride at 650 nm would be 162.5 nm thick. The reflectivity of this combination as a function of wavelength is given in FIG. 10. For comparison, the reflectivity of the reflective layer 147 for a bare layer of gold is plotted on the same axes.

The graph shows the reflectivity of the reflective layer 147 at 650 nm is virtually unchanged with the addition of the half-wave layer of silicon nitride. In practice, the residual film stress of the Au gold layer can be made rather small such that the combined film stress of the Au and underlying Cr layer is dominated by the (tensile) stress of the Cr layer. The present invention identifies that the effect on mirror plate 146 curvature due to the Cr—Au layer can be tuned by varying the thickness of the Cr layer while having no effect on the optical properties of the reflective layer. By taking into consideration that the stress contribution by the half-wave thin film layer 148 needs to be accounted for if an optimally flat mirror plate 146 is desired, the stress can be appropriately varied through changes in the process pressure, the power to the target, and a substrate bias voltage, and a readily achievable value for a silicon nitride film stress is 200 MPa compressive. In an exemplary embodiment, deposition conditions provide a combined Cr—Au film stress of approximately 282 MPa when 16.5 nm of Cr is used in combination with 100 nm of Au. The resulting film thickness and film stress product for the Cr—Au layer 147 is 32,853 MPa-nm tensile and that of the silicon nitride layer 148 is 32,500 MPa-nm compressive such that the stress contributions from each of the layers negate each other for an end result that causes minimal curvature in the released mirror plate 146.

B. Enhanced Gold Reflector (650 nm Laser Light)

Figure 11:
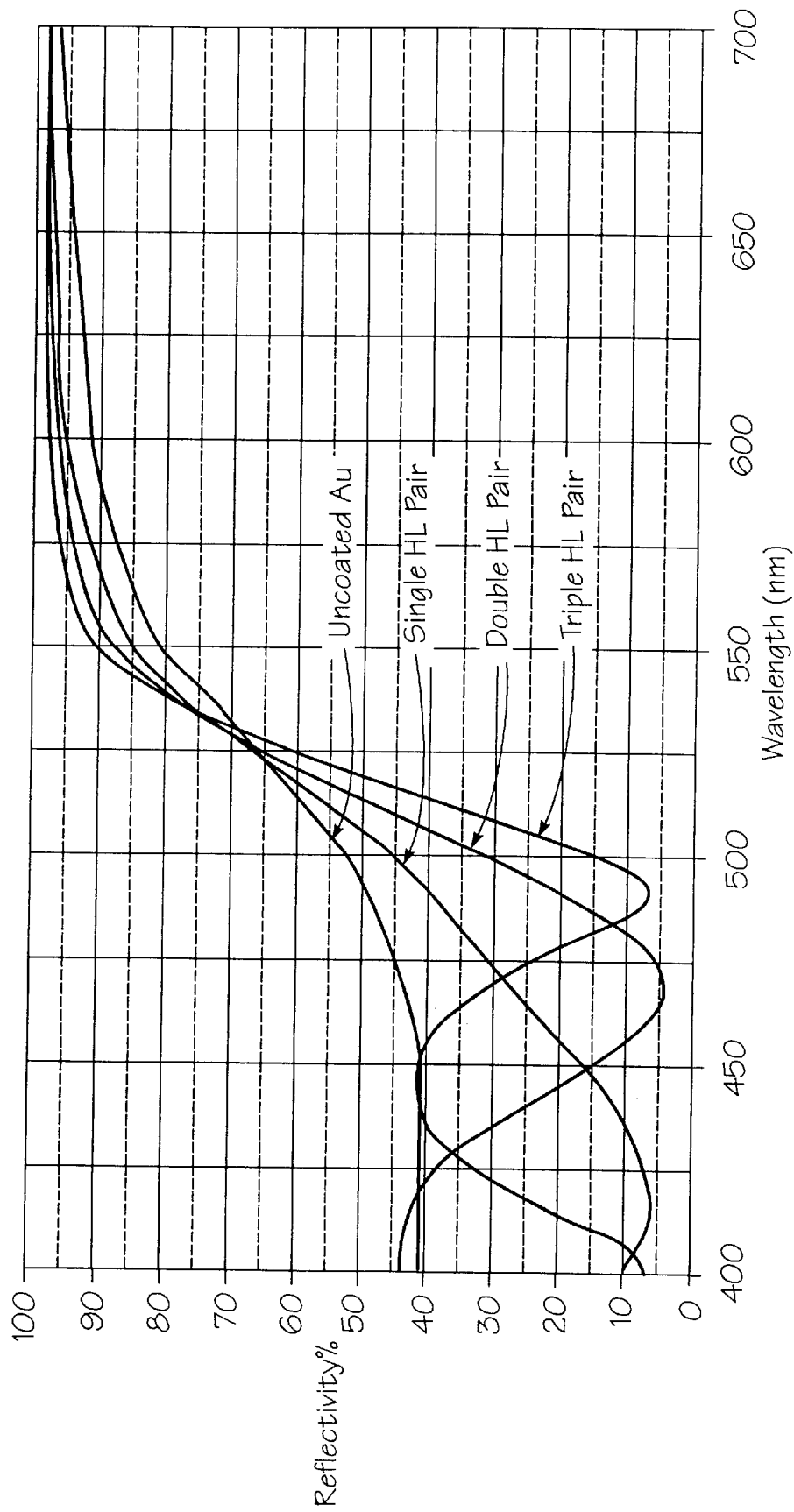
Referring now to FIG. 11, there is seen plots of average reflectivity as a function of wavelength for four cases; and Referring now to FIG. 12, there is seen a plot of reflectivity at 410 nm.

As discussed previously, reflectivity from the mirror plate 146 can be improved through use a quarter wave stack of thin films 148. A single quarter wave stack can be used to raise reflectivity to approximately 97% as compared to 95% for uncoated gold. A second and third quarter wave stack brings the average reflectivity to 98.3% and 99% respectively. Plots of average reflectivity as a function of wavelength for these four cases are shown in FIG. 11.

In an exemplary embodiment, the quarter wave silicon dioxide layer 148a has a refractive index of 1.45 at 650 nm and its thickness is 112.07 nm, and the quarter wave silicon nitride layer 148b thickness is 81.25 nm. In a multi-sourced sputter or evaporation system these layers can be deposited during a single coating run and so, theoretically, a triple thin film HL stack 148 presents no more fabrication complexity than the single HL stack. As the total thickness of the thin films 148 increases, it is understood that it becomes more challenging for a quarter wave thickness of silicon nitride to provide protection to the sidewalls of the underlying layers. As was previously described with reference to FIG. 6, a solution to this problem is to use an additional half-wave silicon nitride layer as the topmost layer.

In the preferred embodiment, residual stress of the sputtered silicon dioxide layer 148a to be deposited is similar in magnitude and sign to that of the sputtered silicon nitride layer 148b. Therefore, the method for balancing the stress discussed above can also be used to balance stress when a combination of thin films 148a and 148b are used. However, as the number of HL pairs is increased, the required thickness of the counterbalancing Cr layer may need to be increased. It is understood that processing of thick Cr layers is more troublesome than for thinner layers, and adhesion of the Cr layer to an underlying polysilicon mirror plate 146 also becomes more difficult as it becomes thicker C. Enhanced Aluminum Reflector (410 nm Laser Light)

The present invention further identifies that in order to achieve high reflectivity at shorter wavelengths, the selection of a different metal reflective layer 147 is needed due to gold's poor reflectivity at shorter wavelengths. In doing so, it is identified that one would prefer not to rely on exotic and/or difficult to process materials. To this end aluminum, which is the most common metallization encountered in semiconductor manufacturing and is fairly reflective (~92.3%) at 410 nm, may be used by the present invention. However, it is understood that aluminum alone does not provide a desired reflectivity of at least 95% at 410 nm, as is desired in the preferred embodiment.

Figure 12:
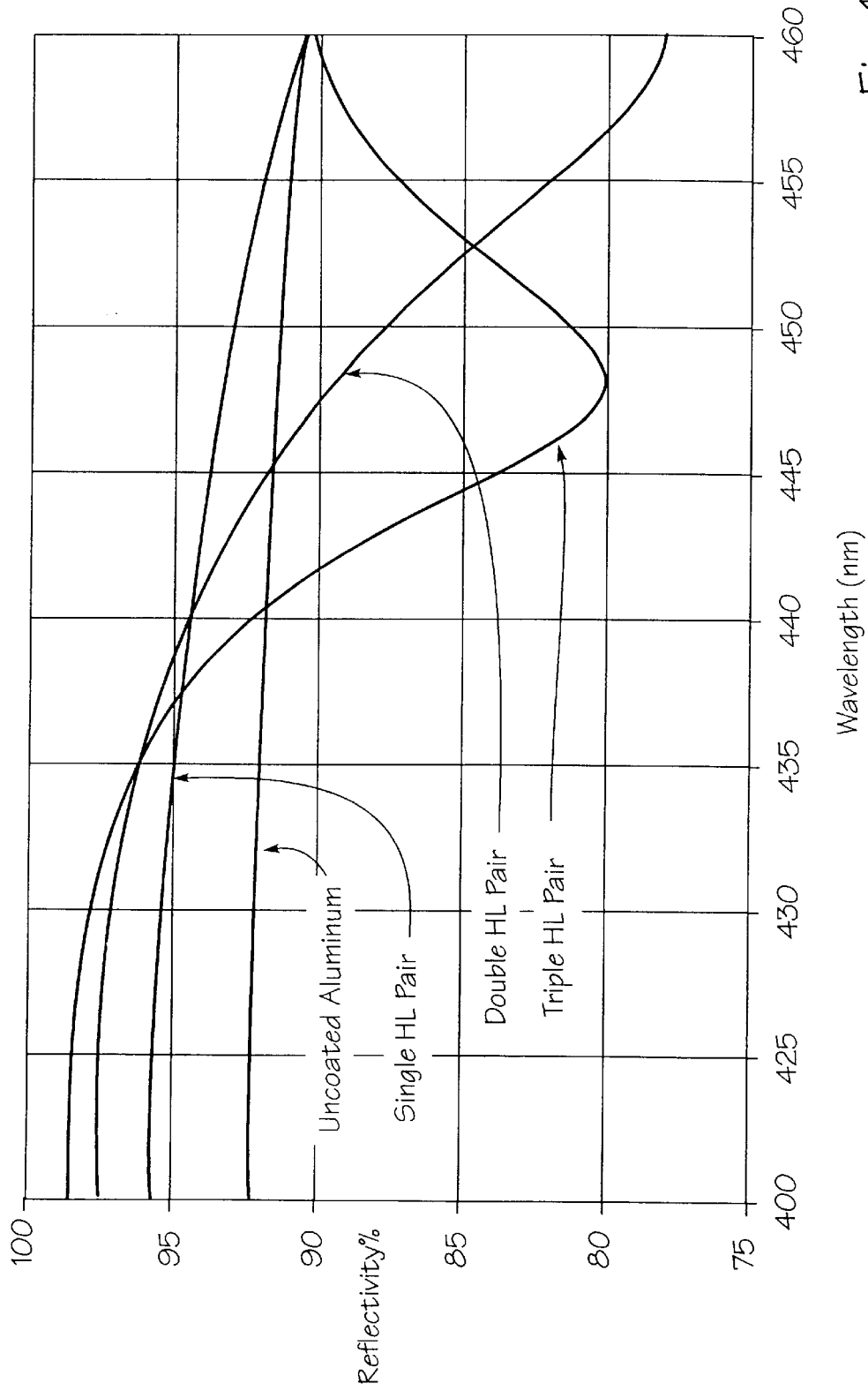

The present invention identifies that enhancement of the reflectivity of an aluminum reflective layer 147 may be achieved by using the quarter-wave stack of thin films 148 described above. FIG. 11 shows a plot of a calculation of an embodiment that uses an aluminum reflective layer 147 in combination with a silicon dioxide (L) layer 148a and silicon nitride (H) layer 148b. For single, double, and triple HL pairs, FIG. 12 shows that the average reflectivity at 410 nm is 95.7%, 97.5%, and 98.5%, respectively. In an exemplary embodiment, at 410 nm, the quarter wave thickness for the silicon dioxide layer 148a is 70 nm and for silicon nitride layer 148b is 51 nm.

The present invention identifies that when the aluminum reflective layer 147 is used, the curvature of the mirror plate 146 may also be minimized using approximately the same approach as previously described for the gold reflective layer. An aluminum reflective layer 147 needs no Cr adhesion layer and has a residual film stress that is similar to that of gold. Although the Cr layer is not needed for adhesion purposes, in the preferred embodiment it is deposited under the aluminum reflective layer 147 so as to provide the same stress balancing capability that is achieved by the Cr—Au reflective layer described above. For an Cr—Al reflective layer 147, the approach is fundamentally the same, whereby the thickness of the Cr layer is adjusted as necessary to balance the thin film's 148 stress. In an exemplary embodiment, the aluminum reflective layer 147 is deposited to a thickness of 60 nm, which is sufficient to maximize its reflectivity. In the event that the stress in the dielectric layers 148*a*/148*b* cannot be balanced by the Cr layer, the film stress of the dielectric layers may be adjusted through modification of their deposition processes. It is understood that for 410 nm, the dielectric layers 148*a*/148*b* could be further protected by a top most half-wave 103 nm layer of silicon nitride to overlap and protect the side-walls of the underlying dielectric layers.

Fabrication Process:

A process flow below describes an exemplary sequence that includes variations for the previously discussed embodiments:

I. Initial Processing of Wafer
  A. Silicon wafer starting material ~500 μm thick.
  B. Deposit 3000 Å thermal silicon dioxide.
  C. Deposit 2500 Å LPCVD silicon nitride.
  D. Deposit 2500 Å LPCVD polysilicon (Poly0). Pattern and etch.
  E. Deposit 2500 Å LPCVD thin PSG. Pattern and etch.
  F. Deposit 10 μm thick PSG and anneal.
  G. Rib Trench pattern and RIE to a depth of 6 μm.
  H. Deposit 2.5 μm of rib fill LPCVD polysilicon (Poly1).
  I. CMP Step 1 of Poly1 back to PSG surface.
  J. Deposit 2.5 μm of mirror plate LPCVD polysilicon (Poly2).
  K. CMP Step 2 of Poly2 to smooth surface while removing 0.5 μm of Poly2.
  L. Mirror plate Poly2 pattern and etch.
  M. Bond Pad Metal (100 Å Cr–7000 Å Au) deposit, pattern, and etch.
  N. Wafer backlap and polish to thin wafer to 175 μm.
  O. HF release etch to clear PSG from under mirror plate.
II. Reflector Options
  A. Protected Gold Reflector
    1. Shadow mask sputter deposit Cr—Au (shadow masking prevents deposition except where desired thus eliminating the need for subsequent patterning and etching of Cr—Au).
    2. Sputter deposit silicon nitride half-wave layer ($\lambda$=650 nm).
    3. Coat with photoresist to protect released mirror plate structures from breakage and to serve as patterning layer for next step.
    4. Pattern and etch silicon nitride to remove it from bond pads so that electrical contact to metal bonding pads is not inhibited.
    5. Remove photoresist layer.
  B. Enhanced Gold Reflector
    1. Shadow mask sputter deposit Cr—Au.
    2. Sputter deposit silicon dioxide and silicon nitride quarter-wave layers ($\lambda$=650 nm). Outermost silicon nitride layer may alternatively by three quarter-wave layer.
    3. Coat with photoresist to protect released mirror plate structures from breakage and to serve as patterning layer for next step.
    4. Pattern and etch silicon nitride to remove it from bond pads so that electrical contact to metal bonding pads is not inhibited.
    5. Remove photoresist layer.
  C. Enhanced Aluminum Reflector
    1. Shadow mask sputter deposit Cr and Aluminum.
    2. Sputter deposit silicon dioxide and silicon nitride quarter-wave layers ($\lambda$=410 nm). Outermost silicon nitride layer may alternatively be three quarter-wave layer.
    3. Coat with photoresist to protect released mirror plate structures from breakage and to serve as patterning layer for next step.
    4. Pattern and etch silicon nitride to remove it from bond pads so that electrical contact to metal bonding pads is not inhibited.
    5. Remove photoresist layer.
III. Final Processing
  A. Coat with photoresist to protect released mirror plate structures from breakage during dicing operation.
  B. Die separation using, typically, a semiconductor dicing saw.
  C. Remove photoresist layer.
  D. Test.

Although the present invention is described to include a means, method, and apparatus to improve reflectivity of a thin mirror plate, those skilled in the art will recognize that the present invention should not be limited to only those elements and structures of the invention described above. For example, it is understood that the discussion above has applicability at wavelengths other than those described, the mirror may comprise other geometries, and the disk drive described above may comprise optical, magneto-optical, and magnetic-optical embodiments which may require other types of optical, electrical elements, and thin film structures. Furthermore, the present invention may be used in applications other than with optical heads, for example, with micro-machined reflectors in optical switches or other devices utilizing reflective surfaces. A latitude of modification, various changes and substitutions are also intended in the foregoing disclosure, and it should be further appreciated that in some instances some features of the invention may be employed without a corresponding use of other features and yet not depart from the scope of the invention. These considerations should make it clear that the invention should be limited only by the scope of the claims presented below.

What is claimed is:

1. A micromachined reflector comprising a planar substrate, a reflective layer, means for securing the reflective layer to the planar substrate, the reflective layer and the means for securing the reflective layer to the planar substrate having an aggregate stress, an additional layer of material secured to the reflective layer, the additional layer having a stress substantially opposing the aggregate stress of the reflective layer and the means for securing the reflective layer to the planar substrate whereby the stress of the additional layer substantially offsets the aggregate stress of the reflective layer and the means for securing the reflective layer to the planar substrate so as to enhance the planarity of the micromachined reflector.

2. The micromachined reflector of claim 1 wherein the reflective layer and the means for securing the reflective layer to the planar substrate have a tensile stress and the additional layer has a compressive stress.

3. The micromachined reflector of claim 1 for use with laser light having a wavelength, wherein the additional layer includes first and second layers each having an optical pathlength equal to one quarter the wavelength of the laser light.

4. The micromachined reflector of claim 1 wherein the additional layer includes a first dielectric layer of a material having a relatively low index of refraction overlying the reflective layer and a second dielectric layer of a material having a relatively high index of refraction overlying the first dielectric layer.

5. The micromachined reflector of claim 4 wherein the additional layer includes a third dielectric layer of a material having a relatively low index of refraction overlying the second dielectric layer and a fourth dielectric layer of a material having a relatively high index of refraction overlying the third dielectric layer.

6. The micromachined reflector of claim 1 wherein the means for securing the reflective layer to the planar substrate is an adhesion layer.

7. The micromachined reflector of claim 6 wherein the adhesion layer is made from chromium.

8. The micromachined reflector of claim 1 wherein the reflective layer is made from a material selected from the group consisting of gold and aluminum.

9. A micromachined reflector for use with laser light having a wavelength comprising a planar substrate, a reflective layer, means for securing the reflective layer to the planar substrate, the reflective layer and the means for securing the reflective layer to the planar substrate having an aggregate stress, an additional layer of material secured to the reflective layer and including a layer having an optical pathlength equal to one half the wavelength of the laser light, the additional layer having a stress substantially opposing the aggregate stress of the reflective layer and the means for securing the reflective layer to the planar substrate whereby the stress of the additional layer substantially offsets the aggregate stress of the reflective layer and the means for securing the reflective layer to the planar substrate so as to enhance the planarity of the micromachined reflector.

10. The micromachined reflector of claim 9 wherein the additional layer includes a layer made from silicon nitride.

11. A micromachined reflector for use with laser light having a wavelength, comprising a planar substrate, a reflective layer, means for securing the reflective layer to the planar substrate, the reflective layer and the means for securing the reflective layer to the planar substrate having an aggregate stress, a first additional layer of material secured to the reflective layer and including a first dielectric layer of a material having a relatively low index of refraction overlying the reflective layer and a second dielectric layer of a material having a relatively high index of refraction overlying the first dielectric layer, a second additional layer overlying the first additional layer and having an optical pathlength equal to one half the wavelength of the laser light, the first additional layer and the second additional layer having a stress substantially opposing the aggregate stress of the reflective layer and the means for securing the reflective layer to the planar substrate whereby the stress of the first additional layer and the second additional layer substantially offsets the aggregate stress of the reflective layer and the means for securing the reflective layer to the planar substrate so as to enhance the planarity of the micromachined reflector.

12. A micromachined reflector comprising a planar substrate, a reflective layer, means for securing the reflective layer to the planar substrate and an additional layer of material secured to the reflective layer, the additional layer including a layer of silicon dioxide overlying the reflective layer and a layer of silicon nitride overlying the layer of silicon dioxide.

13. The micromachined reflector of claim 12 wherein the reflective layer and the means for securing the reflective layer to the planar substrate have an aggregate stress and wherein the additional layer has a stress substantially opposing the aggregate stress of the reflective layer and the means for securing the reflective layer to the planar substrate whereby the stress of the additional layer substantially offsets the aggregate stress of the reflective layer and the means for securing the reflective layer to the planar substrate so as to enhance the planarity of the micromachined reflector.

14. A micromachined reflector for use with laser light having a wavelength comprising a planar substrate, a reflective layer, means for securing the reflective layer to the planar substrate and a dielectric layer secured to the reflective layer for protecting the reflective layer, the reflective layer having a sidewall extending upwardly from the planar substrate, the dielectric layer extending over the sidewall of the reflective layer and having an optical pathlength equal to one half the wavelength of the laser light.

15. A micromachined reflector for use with laser light having a half wavelength comprising a planar substrate, a reflective layer, means for securing the reflective layer to the planar substrate and a dielectric layer of silicon nitride secured to the reflective layer for protecting the reflective layer, the dielectric layer having an optical pathlength equal to one half the wavelength of the laser light.

16. The micromachined reflector of claim 15 wherein the reflective layer is made from gold and the means for securing the reflective layer to the planar substrate is a layer of chromium.

* * * * *